(12) United States Patent
McRae et al.

(10) Patent No.: US 8,681,278 B2
(45) Date of Patent: Mar. 25, 2014

(54) SYSTEM, METHOD AND APPARATUS FOR VOLUME CONTROL

(75) Inventors: Matthew Blake McRae, Laguna Beach, CA (US); John Schindler, Ladera Ranch, CA (US)

(73) Assignee: Vizio, Inc., Irvine, CA (US)

( * ) Notice: Subject to any disclaimer, the term of this patent is extended or adjusted under 35 U.S.C. 154(b) by 259 days.

(21) Appl. No.: 12/824,304

(22) Filed: Jun. 28, 2010

(65) Prior Publication Data

US 2011/0317069 A1   Dec. 29, 2011

(51) Int. Cl.
*H04N 5/60* (2006.01)
(52) U.S. Cl.
USPC ............................ 348/738; 348/552; 348/569
(58) Field of Classification Search
USPC ......... 348/552–553, 738, 723, 725, 722, 734, 348/563–564, 569, 480, 482, 484; 381/104–105, 306, 333, 56, 77
IPC ........................................................ H04N 5/60
See application file for complete search history.

(56) References Cited

U.S. PATENT DOCUMENTS

| | | | | |
|---|---|---|---|---|
| 6,041,225 | A * | 3/2000 | Jung | 455/352 |
| 6,552,753 | B1 * | 4/2003 | Zhurbinskiy et al. | 348/738 |
| 7,113,224 | B2 * | 9/2006 | Inoue et al. | 348/565 |
| 7,672,470 | B2 | 3/2010 | Lee | 381/333 |
| 7,929,063 | B2 * | 4/2011 | Miyoshi | 348/738 |
| 8,406,435 | B2 * | 3/2013 | Yerrace et al. | 381/109 |
| 2009/0249420 | A1 * | 10/2009 | Kim et al. | 725/115 |
| 2009/0262256 | A1 * | 10/2009 | Asayama et al. | 348/738 |
| 2011/0029874 | A1 * | 2/2011 | Profitt | 715/722 |

* cited by examiner

*Primary Examiner* — Trang U Tran
(74) *Attorney, Agent, or Firm* — Law Office of Scott C. Harris, Inc.

(57) ABSTRACT

An application for a system for controlling speaker volume of externally amplified speakers connected to a television includes a television with one or more external amplifiers, each driving one or more speakers. There is a channel for connecting the external amplifiers to the television providing an audio signal to the external amplifiers and a channel for communicating commands from the television to the externally amplifiers, which in some embodiments is the same channel. Responsive to a signal (e.g. remote control command) to the television indicating a request to change the volume of one or more of the external amplifiers, a volume change command is sent to one or more of the external amplifiers over the channel for communicating.

21 Claims, 8 Drawing Sheets

SYSTEM, METHOD AND APPARATUS FOR VOLUME CONTROL

FIELD

This invention relates to the field of devices with external amplified speakers and more particularly to a system for controlling the volume of the external amplified speakers.

BACKGROUND

Devices such as monitors and televisions often have one or more internal speakers. The internal speakers are connected to an internal source of amplified sound and reproduce the amplified sound at a volume controlled by the television. Often, a television is connected to external speakers which are amplified to reproduce sound at locations other than attached to the television such as base sound at some place in the viewing area, higher quality amplifiers and speakers for main channel sound typically located in front of the viewer at the sides of the television and rear channel speakers typically placed behind the viewer.

In some television systems, audio outputs are connected to an external amplifier and the amplifier is connected to one or more external speakers. Alternately, when the sound comes from a source external to the television such as a disk player or a set-top-box, the audio signal is routed directly from the external source to the amplifier. In some systems, the speakers in the television are not used when external speakers are available.

In many external speaker scenarios, the sound is provided in multiple channels such as 5.1 (5 main speakers consisting of left-front, right-front, left-back, right-back, center; plus one base speaker). In such systems, the television is connected to either a stereo system, amplifier or amplified speakers. In some systems, an audio output such as composite audio (L&R) or TOSLINK is connected to an amplifier that amplifies the audio signal and delivers the amplified audio to one or more speakers. In some systems, the amplified speakers are connected to the television by a network, wired or wireless, and the audio signal is sent to the amplified speakers in digital format, and converted to analog, amplified and reproduced by the amplified speaker.

In many of these systems, each individual device, including the television, has independent volume controls. Often, devices such as amplified speakers and amplifiers or stereo systems (connected to speakers) have volume controls and/or remote controls that have the ability to control the volume of their devices. This makes it difficult for the viewer of the television to properly adjust the volume of these devices, especially trying to balance front/rear or side/side volume, since it is best to do so while seated in a position where the sound will be enjoyed.

What is needed is a system that controls the volume of several devices that are connected to a television.

SUMMARY

The present invention includes a system such as a television that has at least one external speaker that has an independent volume control. The system provides a user interface and control system that, utilizing the television remote control, adjusts the volume settings of the various external speaker and amplification systems.

In one embodiment, a system for controlling speaker volume of externally amplified speakers connected to a television is disclosed. The system has a television with one or more external amplifiers, each driving one or more speakers. There is a channel for connecting the external amplifiers to the television providing an audio signal to the external amplifiers and a channel for communicating commands from the television to the externally amplifiers, which in some embodiments is the same channel. Responsive to a signal (e.g. remote control command) to the television indicating a request to change the volume of one or more of the external amplifiers, a volume change command is sent to one or more of the external amplifiers over the channel for communicating.

In another embodiment, a method of controlling volume is disclosed including connecting an audio signal of a television to one or more external amplifiers and presenting a user interface on a display of the television. The user interface indicates a volume level of one or more of the external amplifiers. A volume change command is sent from a remote control to the television. Responsive to the volume change command, a volume change request is sent to one or more of the external amplifiers and the one or more amplifiers change an associated volume setting responsive to the volume change request.

In another embodiment, a television system is disclosed including a television having a display and at least one external amplifier connected to the television. Each of the at least one external amplifiers is connected to one or more speakers. An audio interface connects an audio signal from the television to the at least one external amplifier and a communications interface between the television and the at least one external amplifier provides for control of the at least one external amplifier by the television. A user interface is presented on the display and accepts volume change commands from a remote control device. Responsive to the volume change commands, the television signals one or more of the at least one external amplifier over the communications interface to change a volume setting.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
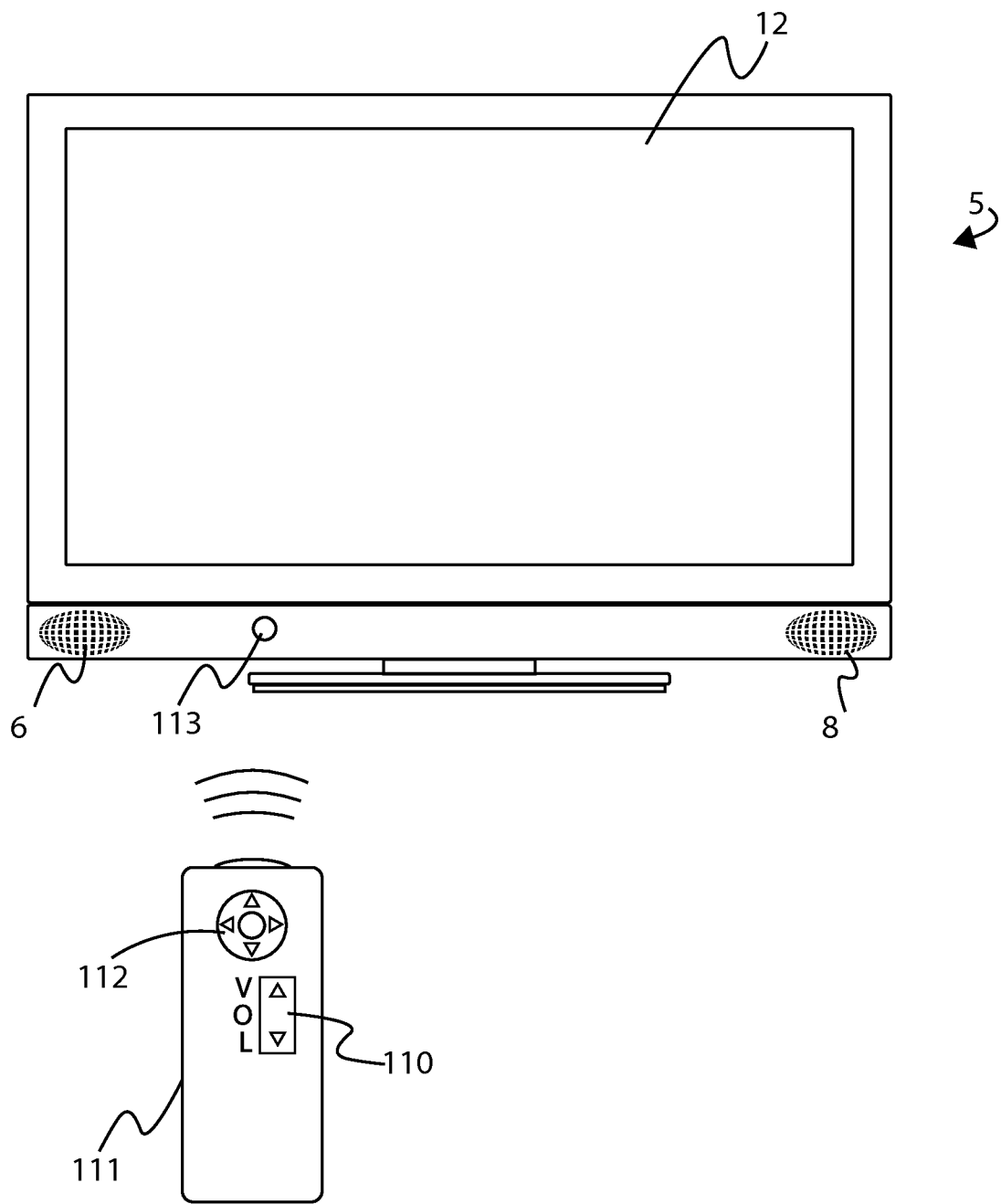
FIG. 1 illustrates a plan view of a television with internal speakers of the prior art.

Reference will now be made in detail to the presently preferred embodiments of the invention, examples of which are illustrated in the accompanying drawings. Throughout the following detailed description, the same reference numerals refer to the same elements in all figures. The present invention applies to any system having audio outputs that are connected to any amplifier and the amplifier is connected to one or more speakers, including combined devices that include both the amplifier and speaker.

Referring to FIG. 1, a plan view of a television 5 of the prior art will be described. Typically, the monitor or television has a display panel 12 such as a Liquid Crystal Display (LCD), Light Emitting Diode (LED) array, Cathode Ray Tube (CRT), Plasma panel, Organic Light Emitting Display (OLED) panel, etc. Not visible, but within the monitor or television 5 is a source of amplified audio that is typically connected to internal speaker(s) 6/8 for delivery of sound to a viewer's ears. Most televisions 5 are controlled by a remote control 111. Responsive to a viewer pressing keys 110/112 on the remote control 111, the remote control 111 signals the television 5 to act on the keys pressed. For example, when a volume control key 110 (up or down) is pressed, the remote control emits a signal (e.g. infra red or radio frequency signal) that is received by a receiver 113 on the television 5 and the television 5 performs the operation (e.g. volume up or down).

Figure 2:
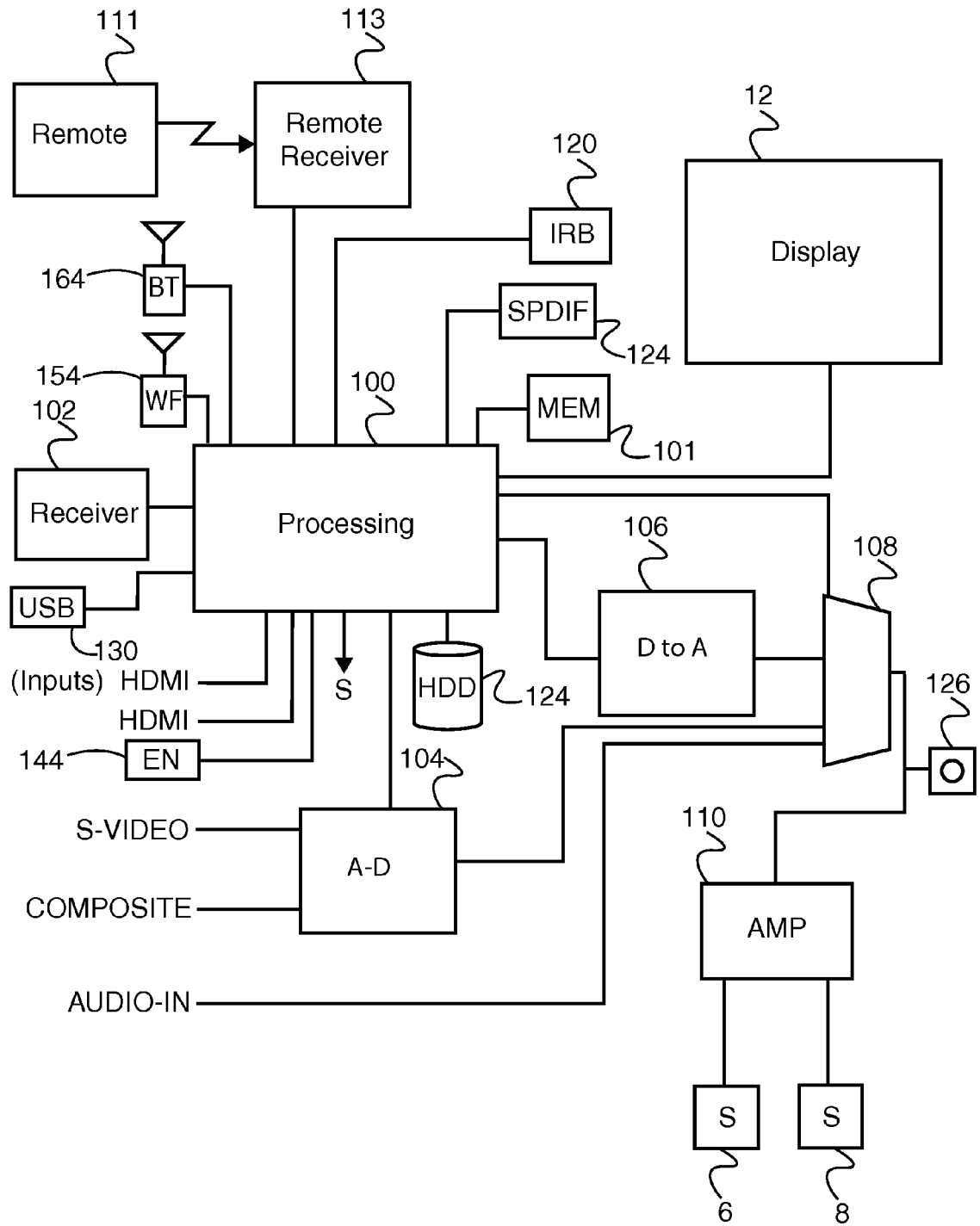
FIG. 2 illustrates a schematic view of a television with various forms of analog and/or digital outputs.

Referring to FIG. 2, a schematic view of a typical television 5 of the present invention will be described. This figure is intended as a representative schematic of a typical television 5 and in practice, some elements are not present in some televisions 5 and/or additional elements are present in other television 5. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Media Inputs (HDMI), USB ports 130 and an analog-to-digital converter 104. The analog-to-digital converter 104 accepts analog inputs from legacy video sources such as S-Video and Composite audio/video and converts the analog audio and/or video signals into digital signals before passing it to the processing element 100. The processing element 100 controls the display of images/video on the display panel 12.

Audio emanates from either the broadcast receiver 102, the legacy source(s) (e.g., S-Video) or discrete analog audio inputs (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio composite audio output 126 and to an internal audio amplifier 110. The internal audio amplifier 110 amplifies the audio and delivers the amplified audio to internal speakers 6/8.

Additionally, in various embodiments, audio emanates from the television 5 on any of the known digital subsystems, including, but not limited to, USB 130, SPDIF 124, Ethernet 144, Wi-Fi, 154 and Bluetooth 164.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way (unidirectional) from the remote 111 to the receiver 113 or bidirectional including a transmission path back to the remote control 111 from the remote receiver 113. When bidirectional, there are no limitations as to both directions utilizing the same wireless technology (e.g., the remote control 111 sends using IR and the television 5 sends using RF).

Upon reception of a command from the remote control 111 through the remote receiver 113 (for example), the processing element 100 operates on the command, for example, increasing or decreasing the volume delivered from the amplifier 110.

In some embodiments, an IR blaster 120 is present. The IR blaster emits, under control of the processing element 100, remote control commands that mimic commands from other remote controls 211/231 (see FIGS. 3, 5 and 7) to control other devices such as amplifiers 200 (FIGS. 4 and 6) or amplified speakers (see FIG. 8).

Figure 3:
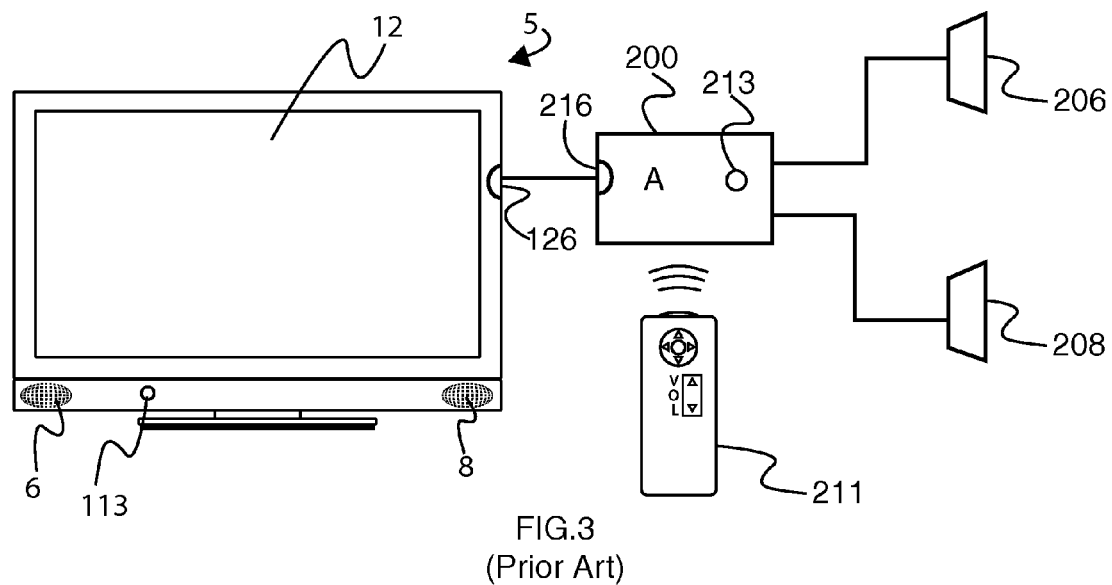
FIG. 3 illustrates a plan view of a television with composite audio outputs connected to an amplifier of the prior art.

Referring to FIG. 3, a plan view of a television 5 with composite audio outputs connected to an amplifier of the prior art is shown. In this example, the composite audio outputs 126 (L and R) are connected to the line input 216 of an amplifier or stereo system 200. The amplifier or stereo 200 amplifies the industry standard 1V peak-to-peak signal from the composite audio outputs 126 and presents the amplified audio to one or more speakers 206/208. Such amplifiers or stereo systems 200 have their own volume control and often have their own remote control 211 and wireless remote control signal receiver 213. To control the volume of the amplifier or stereo 200, the viewer uses the remote control 211, pressing the volume up or down keys while aiming the remote control 211 at the remote control receiver 213. Often, users of such configurations don't want to have several remote controls 111/211 and often seek solutions to rid themselves of one or more of the remote controls 111/211. For example, a universal remote control signals the television 5 to change channels but when the volume keys are used, the universal remote control signals the amplifier to increase/decrease volume. This improves the situation but doesn't provide on-screen user interfaces for the stereo/amplifier 200 and, when multiple speaker systems are used, there is no master volume control that proportionally adjusts all speakers (e.g. television speakers 6/8 and the speakers connected to the amplifier 206/208).

Figure 4:
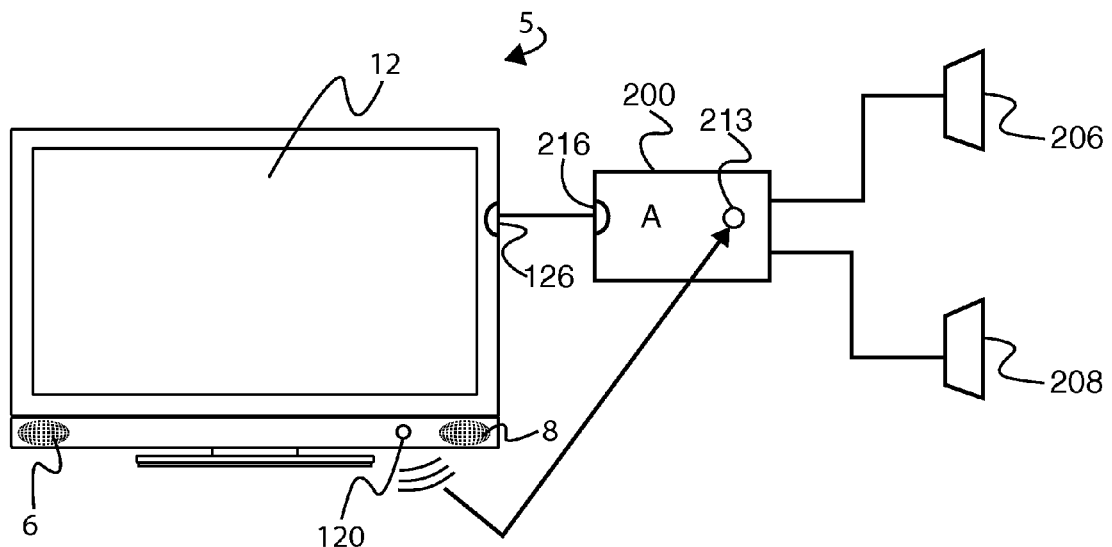
FIG. 4 illustrates a plan view of a television with composite audio outputs connected to an amplifier that is controlled by the television.
Figure 10:
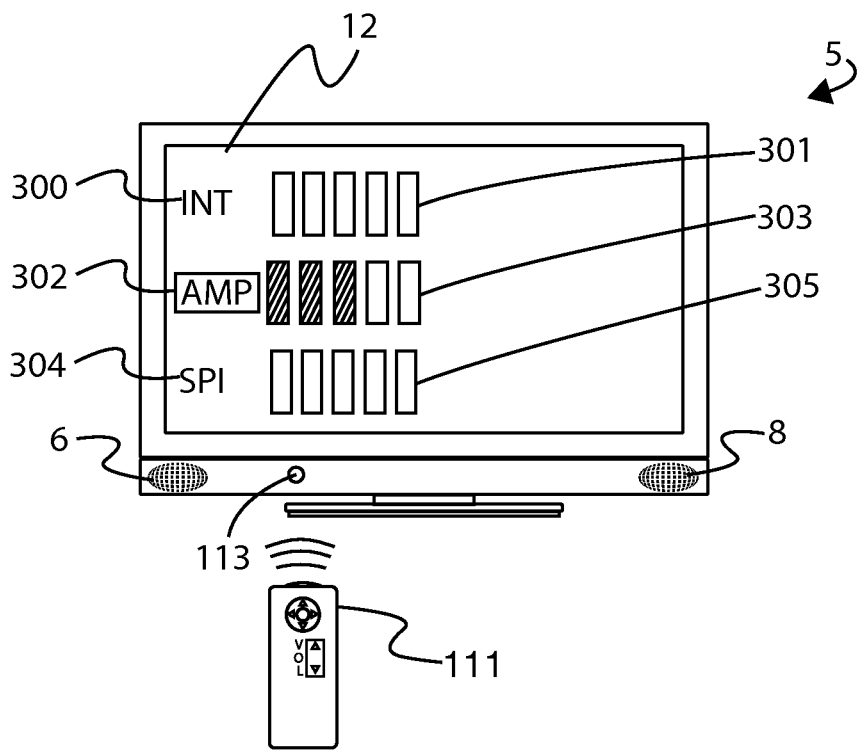
FIG. 10 illustrates a plan view of a television with an exemplary volume control user interface for control of internal and externally amplified speakers.
Figure 11:
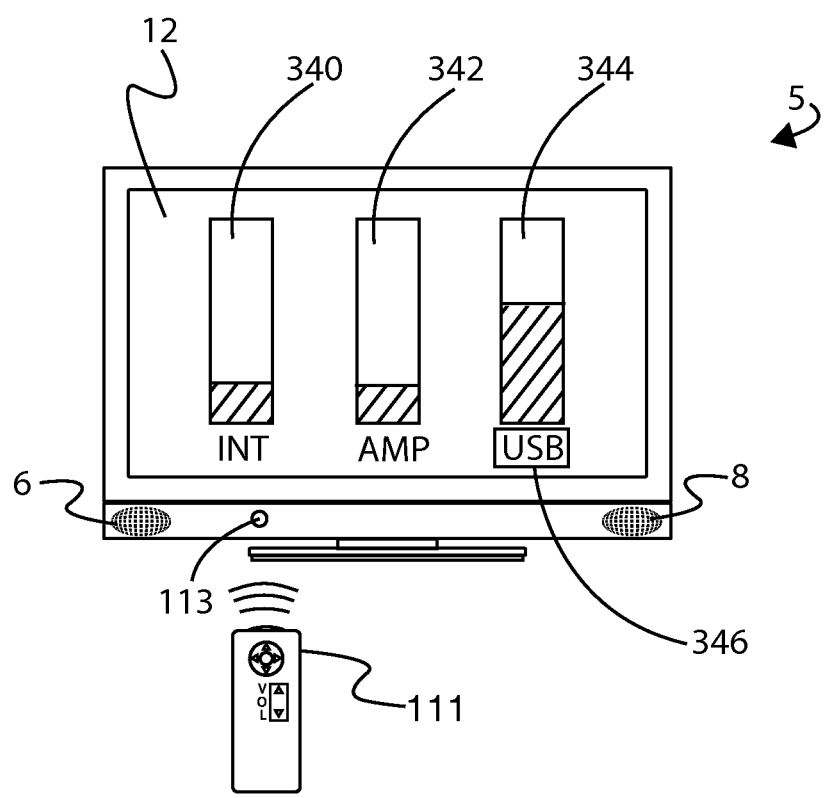
FIG. 11 illustrates a plan view of a television with a second exemplary volume control user interface for control of internal and externally amplified speakers.

Referring to FIG. 4, a plan view of a television 5 with composite audio outputs connected to an amplifier that is controlled by the television is shown. In this example, the composite audio outputs 126 (L and R) are connected to the line input 216 of an amplifier or stereo system 200 as in the previous example. The amplifier or stereo 200 amplifies the industry standard 1V peak-to-peak signal from the composite audio outputs 126 and presents the amplified audio to one or more speakers 206/208. Such amplifiers or stereo systems 200 have their own volume control and often have their own remote control 211 (see FIG. 3) and wireless remote control signal receiver 213. With the present system, control of the volume of the amplifier or stereo 200 is performed by the television 5. Pressing the volume up or down keys on the remote control 111 signals the television remote control receiver 113 and the television 5 acts on the signals by presenting a user interface. Typical user interfaces are shown in FIGS. 10 and 11. Using other remote control 111 keys such as navigation keys 112, the user interface is directed to select the desired device (or devices) and the television 5, responsive to the volume up/down signals, instructs the respective device to increase or decrease the device's amplification, hence volume. In this example, the television 5 signals the amplifier 200 by sending commands to the amplifier 200 to the amplifier's remote control receiver 213, for example by imitating volume up/down commands normally sent by the amplifier's remote control 211 through a remote control simulator, also known as an IR blaster 120. In this way, the volume of the television 5 speakers 6/8 and/or the amplifier 200 speakers 206/208 are controlled through a common user interface using a single remote control.

Figure 5:
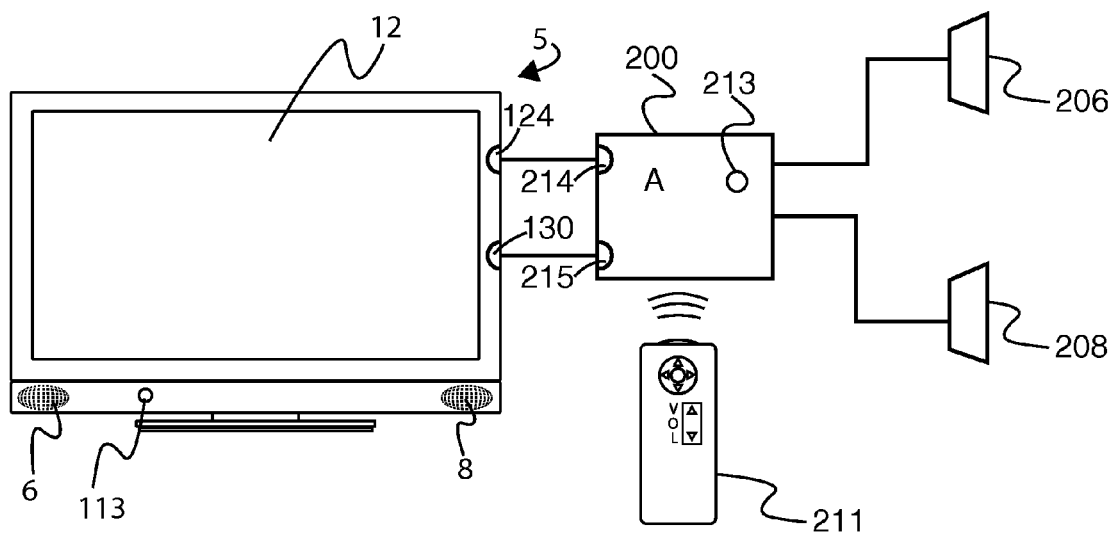
FIG. 5 illustrates a plan view of a television connected by digital audio outputs to an amplifier and speaker(s) of the prior art.

Referring to FIG. 5, a plan view of a television 5 connected by digital audio outputs to an amplifier and speaker(s) of the prior art is shown. In this example, the digital audio outputs 124 (e.g. TOSLINK) are connected to the digital audio input 214 of an amplifier or stereo system 200. The amplifier or stereo 200 converts the digital audio signal into an analog audio signal, amplifies the analog audio signal and presents the amplified audio to one or more speakers 206/208. In some embodiments, there is also a digital control link such as a USB connection from the USB port 130 on the television 5 to the USB port 215 on the amplifier.

Such amplifiers or stereo systems 200 have their own volume control and often have their own remote control 211 and wireless remote control signal receiver 213. To control the volume of the amplifier or stereo 200, the viewer uses the remote control 211, pressing the volume up or down keys in the vicinity of the remote control receiver 213. Often, users of such configurations don't want to have several remote controls 111/211 and often seek solutions to rid themselves of one or more of the remote controls 111/211. For example, a universal remote control signals the television 5 to change channels but when the volume keys are used, the universal remote control signals the amplifier to increase/decrease volume. This improves the situation but doesn't provide on-screen user interfaces for the stereo/amplifier 200 and, when multiple speaker systems are used, there is no master volume control that proportionally adjusts all speakers (e.g. television speakers 6/8 and the speakers connected to the amplifier 206/208).

Figure 6:
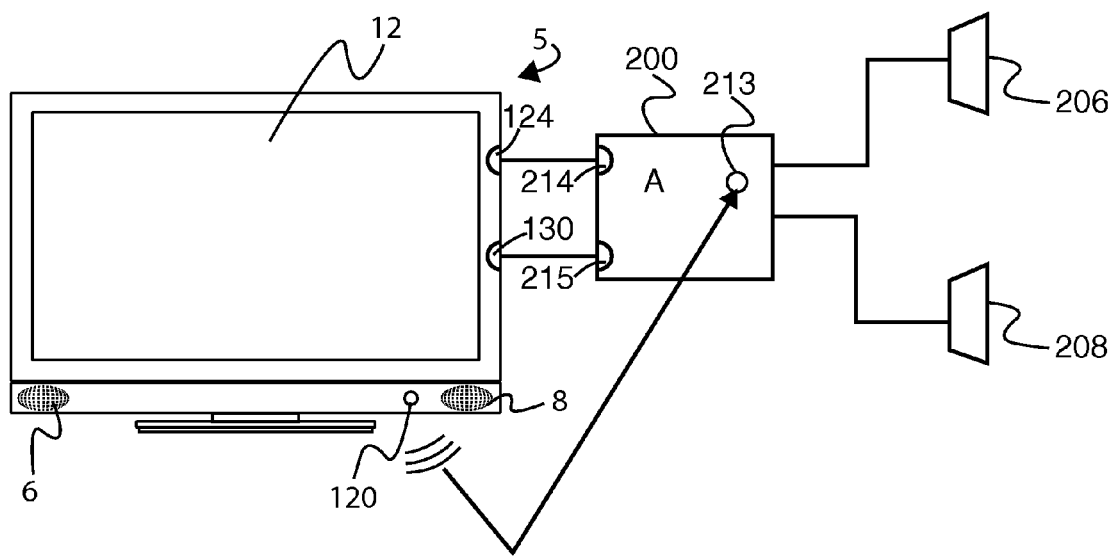
FIG. 6 illustrates a plan view of a television connected by digital audio outputs and controlling an amplifier that is connected to one or more speaker.

Referring to FIG. 6, a plan view of a television 5 connected by digital audio outputs and controlling an amplifier that is connected to one or more speaker is shown. In this example, the digital audio outputs 124 (e.g. TOSLINK) are connected to the digital audio input 214 of an amplifier or stereo system 200. The amplifier or stereo 200 converts the digital audio signal into an analog audio signal, amplifies the analog audio signal and presents the amplified audio to one or more speakers 206/208. In some embodiments, there is also a digital control link such as a USB connection from the USB port 130 on the television 5 to the USB port 215 on the amplifier. Such amplifiers or stereo systems 200 have their own volume control and often have their own remote control 211 (see FIG. 5) and wireless remote control signal receiver 213. In the present system, control of the volume of the amplifier or stereo 200 is performed by the television 5. Pressing the volume up or down keys on the remote control 111 signals the television remote control receiver 113 and the television 5 acts on the signals by presenting a user interface. Typical user interfaces are shown in FIGS. 10 and 11. Using other remote control 111 keys such as navigation keys 112, the user interface is directed to select the desired device (or devices) and the television 5 user interface, responsive to the volume up/down signals, instructs the respective device to increase or decrease the device's amplification, hence volume. In one embodiment, the television 5 signals the amplifier 200 by sending commands to the amplifier 200 to the amplifier's remote control receiver 213, for example by imitating volume up/down commands normally sent by the amplifier's remote control 211 through a remote control simulator, also known as an IR blaster 120. In another embodiment, the television 5 signals the amplifier 200 by sending commands to the amplifier 200 over the digital interface (e.g. USB 130/215). In these ways, the volume of the television 5 speakers 6/8 and/or the amplifier 200 speakers 206/208 are controlled through a common user interface using a single remote control.

Figure 7:
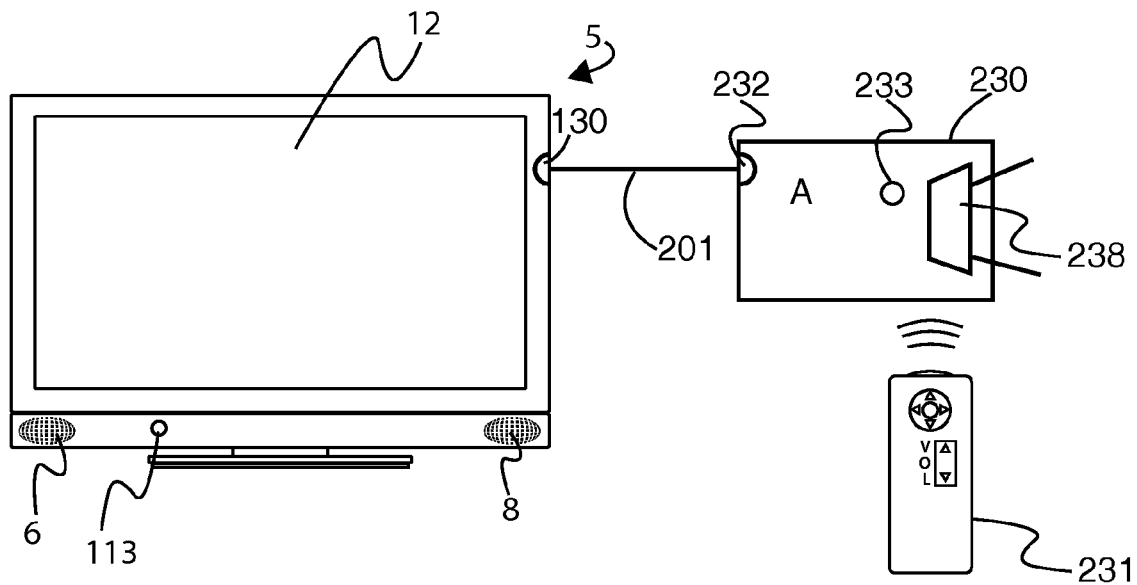
FIG. 7 illustrates a plan view of a television connected by a digital bus to amplified speakers of the prior art.

Referring to FIG. 7, a plan view of a television 5 connected by a digital bus to amplified speakers 230 of the prior art is shown. In this example, the audio output of the television 5 is in the form of digital packets sent over a communications link 201. Although shown as a USB communications link 201 connecting the USB output port 130 of the television 5 to the USB input port 232 of the amplified speaker 232, other communications links have been used, such as proprietary protocols or standard protocols such as Firewire, Ethernet, Wi-Fi, Bluetooth, etc. The amplified speakers 230 receives the packets per the communications protocol, converts the digital audio from the packets into an analog audio signal, amplifies the analog audio signal and presents the amplified audio to one or more speakers 238.

Such amplified speakers 230 have their own volume control and often have their own remote control 231 and wireless remote control signal receiver 233. To control the volume of the amplifier or stereo 200, the viewer uses the remote control 231, pressing the volume up or down keys in the vicinity of the remote control receiver 233. Often, users of such configurations don't want to have several remote controls 111/231 and often seek solutions to rid themselves of one or more of the remote controls 111/231. For example, a universal remote control signals the television 5 to change channels but when the volume keys are used, the universal remote control signals the amplified speakers 230 to increase/decrease volume. This improves the situation but doesn't provide on-screen user interfaces for the amplified speakers 230 and, when multiple speaker systems are used, there is no master volume control that proportionally adjusts all speakers (e.g. television speakers 6/8 and the amplified speakers 230).

Figure 8:
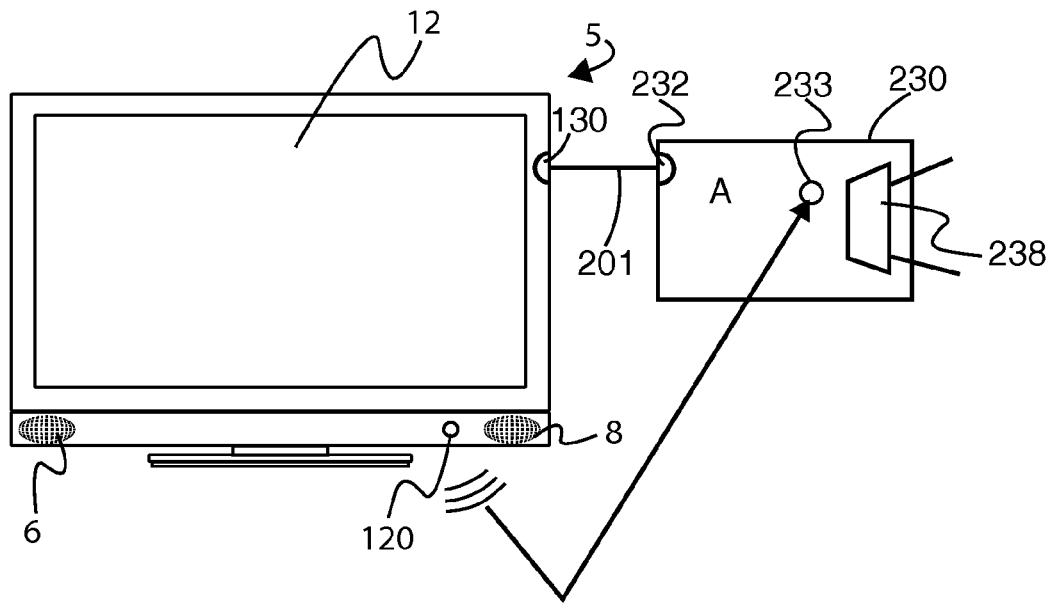
FIG. 8 illustrates a plan view of a television connected by digital bus and controlling amplified speakers.

Referring to FIG. 8, a plan view of a television connected by digital bus and controlling amplified speakers is shown. In this example, the audio output of the television 5 is in the form of digital packets sent over a communications link 201. Although shown as a USB communications link 201 connecting the USB output port 130 of the television 5 to the USB input port 232 of the amplified speaker 232, any known or future communications link is anticipated including, but not limited to, proprietary protocols or standard protocols such as Firewire, Ethernet, Wi-Fi, Bluetooth, etc. The amplified speakers 230 receives the packets per the communications protocol, converts the digital audio from the packets into an analog audio signal, amplifies the analog audio signal and presents the amplified audio to one or more speakers 238. Such amplified speakers 230 have their own volume control and often have their own remote control 231 (see FIG. 7) and wireless remote control signal receiver 233. In the present system, control of the volume of the amplified speakers 230 is performed by the television 5. Pressing the volume up or down keys on the remote control 111 signals the television remote control receiver 113 and the television 5 acts on the signals by presenting a user interface. Typical user interfaces are shown in FIGS. 10 and 11. Using other remote control 111 keys such as navigation keys 112, the user interface is directed to select the desired device (or devices) and the television 5, responsive to the volume up/down signals, instructs the respective device to increase or decrease the device's amplification, hence volume. In one embodiment, the television 5 signals the amplified speakers 230 by sending commands to the amplified speakers 230 to the amplifier's remote control receiver 213, for example by imitating volume up/down commands normally sent by the amplifier's remote control 231 through a remote control simulator, also known as an IR blaster 120. In another embodiment, the television 5 signals the amplified speakers 230 by sending commands to the amplified speakers 230 over the communications link 201 (e.g. USB, Ethernet, WiFi, Bluetooth, etc). In these ways, the volume of the television 5 speakers 6/8 and/or the amplified speakers 230 are controlled through a common user interface using a single remote control.

Figure 9:
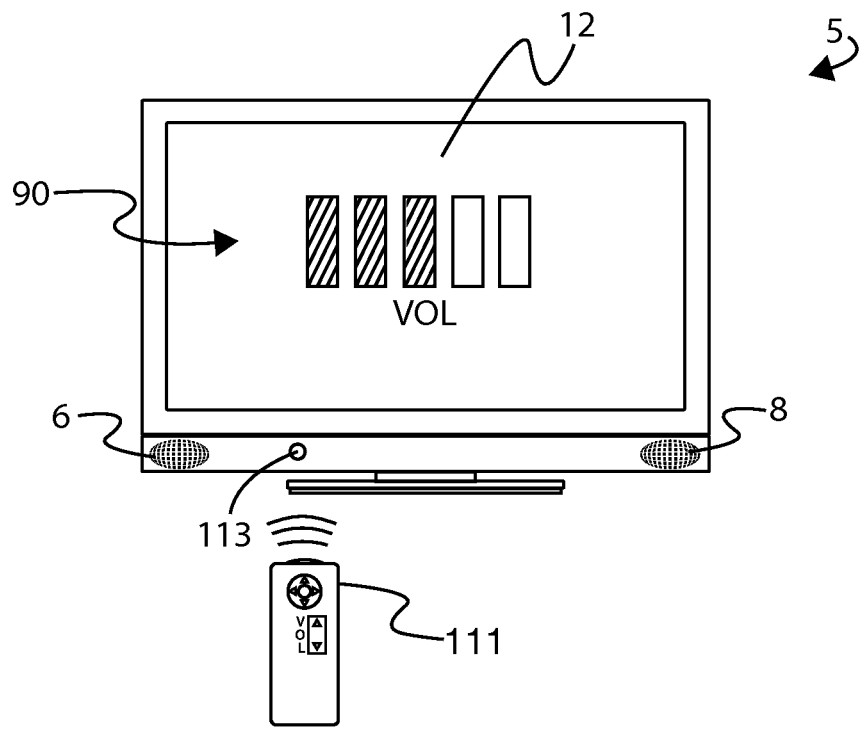
FIG. 9 illustrates a plan view of a television with an exemplary volume control user interface of the prior art.

Referring to FIG. 9, a plan view of a television 5 with an exemplary volume control user interface of the prior art is shown. Prior television 5 receive volume up/down signals from the remote control 111 and either adjust the volume of the sound from the speakers 6/8 without showing a user interface, or provide some sort of feedback to the viewer such as a bar graph 90 or other numeric or graphical indication. Often, after a period of time lapses in which no further volume up/down keys are pressed on the remote control 111, the user interface 90 is removed from the display 12 of the television 5.

Referring to FIG. 10, a plan view of a television 5 with an exemplary volume control user interface for control of internal and/or externally amplified speakers is shown. In this exemplary user interface, there are three separate volume controls. A first interface 300 for internal speakers 6/8, a second interface 302 for an external amplifier 200 and a third interface 304 for an amplified speaker 230. Although many user interface types are known, this example uses horizontal bar graphs 301/303/305. As shown, the volume of the internal speakers 6/8 and the amplified speakers 230 is at zero (no bars 301/305) and the volume of the amplifier 200 is set at, for example, 60% (three of five bars 303). In this example, the current focus is indicated by the name (e.g. "AMP") being underlined or highlighted in any other way known. The focus is altered using, for example, navigation keys 112 of the television's remote control 111. When the volume up/down keys of the television's remote control 111 are pressed, the volume of the selected device (or devices) is/are increased or decreased as described previously and the bar graph(s) 301/303/305 are updated to reflect the new volume of each device 5/200/230.

Referring to FIG. 11, a plan view of a television 5 with a second exemplary volume control user interface for control of internal and externally amplified speakers is shown. In this exemplary user interface, there are three separate volume controls. A first interface 340 for internal speakers 6/8, a second interface 342 for an external amplifier 200 and a third interface 344 for an amplified speaker 230. Although many user interface types are known, this example uses vertical bar graphs 340/342/344. As shown, the volume of the internal speakers 6/8 and the amplified speakers 230 is at zero (minimal height bars 340/344) and the volume of the amplifier 200 is set at, for example, 50% (half-height bar 342). In this example, the current focus 346 is indicated by the name (e.g. "USB") being underlined or highlighted in any other way known (e.g. shaded or in a box). The focus is altered using, for example, navigation keys 112 of the television's remote control 111. When the volume up/down keys of the television's remote control 111 are pressed, the volume of the selected device (or devices) is/are increased or decreased as described previously and the bar graph(s) 340/342/344 are updated to reflect the new volume of each device 5/200/230.

Figure 12:
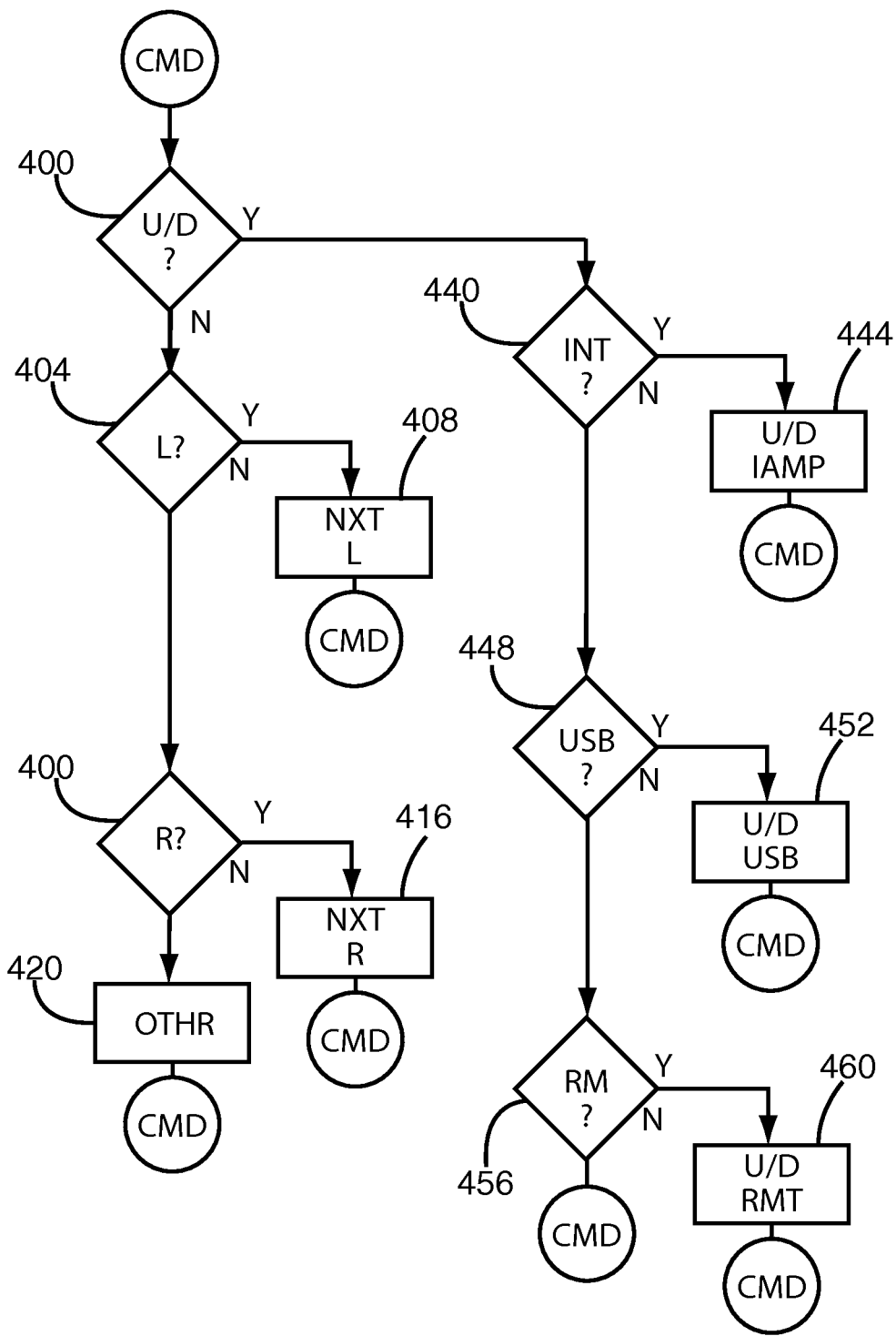
FIG. 12 illustrates a flow chart of the present invention.

Referring to FIG. 12, a flow chart of the present invention is shown. The method is performed, for example, by the processing element 100 of the television 5 with the reception of a command from the remote control 111. If the command isn't 400 a volume up/down command then it is determined if it is a left navigation command 404 and if so, volume control focus is changed 408 to the previous device in the list (next left). If it is a right navigation command 412 the volume control focus is changed 416 to the next device in the list (next right). For embodiments having vertical orientations, the up and down arrow key is used for navigation.

If the command is 400 a volume up/down command then the current focus is used to determine which device is being controlled. If the focus is the internal speakers 440, then the volume of the internal speakers 6/8 is changed 444 up or down, dependent upon the command from the remote control 111 and the user interface is updated. If the focus is the an amplified speaker 448, then the volume of the amplified speaker 230 is changed 452 up or down, dependent upon the command from the remote control 111 and the user interface is updated. If the focus is the external amplifier 456, then the volume of the amplifier is changed 460 up or down, dependent upon the command from the remote control 111 and the user interface is updated.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for controlling speaker volume of externally amplified speakers connected to a television, the system comprising:
a television;
a first connection on the television to a first external amplified audio system outputting a first audio signal to said first external amplified audio system;
a second connection on the television to a second external amplified audio system, outputting a second audio signal to said second external amplified audio system said first external amplified audio system being separate from the first external amplified audio system;
a processor, operating for controlling operation of the television, including receiving a request to change volume of the television from a remote control, and to translate said request to change volume from said remote control into output commands to change an amount of amplification by said external audio systems, said output commands including first signals in a format that change an amount of amplification of said first audio signal by the first external amplified audio system and said output commands also include second signals in a different format, that change an amount of amplification of said second audio signal by the second external amplified audio system, and wherein the processor uses a digital interface to send the volume change command to the one or more of the external audio systems, and where the amounts of amplification by said first and second external audio systems are different levels;

wherein the television includes a display screen, that displays television content, and also displays output levels of both said first and second external amplified audio systems, where said output levels of said first and second external amplified audio systems are displayed at levels that are different than one another.

2. The system of claim 1, wherein first connection is a composite audio connection.

3. The system of claim 1, wherein the first connection is a digital audio output.

4. The system of claim 1, wherein the first connection is a network connection.

5. The system of claim 1, wherein said processor also includes a user interface that receives commands to change a volume level of said first external amplified audio system relative to said second external amplified audio system, and thereafter automatically maintains output volumes of said first external amplified audio system at a set level relative to said second external amplified audio system.

6. The system of claim 1, where the output commands do not change the level of the audio signals.

7. A method of controlling volume of external devices on a television, the method comprising:

providing a first connection of a first audio signal of a television to a first external amplified audio system and a second connection of a second audio signal of the television to a second external amplified audio system, separate from the first external amplified audio system;

presenting a user interface on a display of the television, the user interface indicating both of the first volume level output on the connection to the first amplified audio system and a second volume level output on the second connection to the second amplified external audio system;

receiving a volume change command from a remote control to the television;

responsive to the volume change command, translate the volume change command from said remote control into output commands to change an amount of amplification by said external audio systems, said output commands including first signals in a format that change an amount of amplification of said first audio signal by the first external amplified audio system and said output commands also include second signals in a different format, that change an amount of amplification of said second audio signal by the second external amplified audio system where the amounts of amplification by said first and second external amplified audio systems are different levels; using a digital interface to send the volume change command to the one or more of the external amplified audio systems;

and where the user interface shows the output levels of said first and second external amplified audio systems are displayed at levels that are different than one another.

8. The method of claim 7, wherein the first connection is a digital audio output of the television connected to a digital audio input of the one or more of the amplifiers.

9. The method of claim 7, wherein the first connection is a composite audio output of the television connected to an audio input of the one or more of the amplifiers.

10. The method of claim 7, wherein the first connection is a network connection from the television connected to the one or more of the amplifiers.

11. The method of claim 8, wherein the digital audio output is selected from the group consisting of SPDIF, TOSLINK, Bluetooth and Universal Serial Bus.

12. The method of claim 10, wherein the network connection is selected from the group consisting of Ethernet, Wi-Fi and Bluetooth.

13. The method of claim 7, wherein the television has an infra red emitter and uses the infra red emitter to send the volume change command to the one or more of the external amplifiers.

14. The method of claim 7, further comprising using a network connection to send the volume change command to the one or more of the external amplifiers.

15. The method of claim 7, wherein the digital interface is selected from the group consisting of Universal Serial Bus and Firewire.

16. The method of claim 14, wherein the network connection is selected from the group consisting of Ethernet, Wi-Fi and Bluetooth.

17. The method of claim 7, where the output commands do not change the level of the audio signals.

18. A television system comprising:

a television having a display;

a first connection on the television to a first external amplified audio system which is an analog audio system, said first connection outputting a first audio signal to said first external amplified audio system;

a second connection on the television to a second external amplified audio system, which is a digital audio system and is separate from the first external amplified audio system, said second connection outputting a second audio signal to said second external amplified audio system;

a communications interface between the television and the first external amplified audio system and the second external amplified audio system;

a user interface presented on the display, the user interface accepting volume change commands from a remote control device and responsive to the volume change commands, the television translating said commands to change volume from said remote control into output commands to change an amount of amplification by said external audio systems, said output commands including first signals in a format that change an amount of amplification of said first audio signal by the first external amplified audio system and said output commands also include second signals in a different format, that change an amount of amplification of said second audio signal by the second external amplified audio system, and also to produce a visual indication of a first level of the first external amplified audio system and a second level of the second external amplified audio system that is different than the first level; and a digital interface to send the volume change command to the one or more of the external audio systems.

19. The television system of claim 18, wherein user interface that receives commands to change a volume level of said first external amplified audio system relative to said second external amplified audio system, and thereafter automatically maintains output volumes of said first external amplified audio system at a set level relative to said second external amplified audio system.

20. The television system of claim 18, wherein the first connection in the second connection are selected from the group consisting of composite audio, SPDIF, TOSLINK, Firewire, Universal Serial Bus, Ethernet, WiFi and Bluetooth.

21. The system of claim 18, where the output commands do not change the level of the audio signals.

* * * * *